United States Patent
Enomoto

Patent Number: 6,072,638
Date of Patent: Jun. 6, 2000

[54] ZOOM LENS SYSTEM

[75] Inventor: Takashi Enomoto, Chiba, Japan

[73] Assignee: Asahi Kogaku Kogyo Kabushiki Kaisha, Tokyo, Japan

[21] Appl. No.: 09/349,723

[22] Filed: Jul. 8, 1999

[30] Foreign Application Priority Data

Jul. 14, 1998 [JP] Japan .................... 10-199216

[51] Int. Cl.$^7$ .................................................. G02B 15/14
[52] U.S. Cl. ......................................................... 359/692
[58] Field of Search .................... 359/687, 688, 359/690, 692

[56] References Cited

U.S. PATENT DOCUMENTS

| | | |
|---|---|---|
| 4,720,179 | 1/1988 | Ito . |
| 4,818,081 | 4/1989 | Ito . |
| 4,836,663 | 6/1989 | Ito . |
| 4,906,077 | 3/1990 | Ito . |
| 5,280,390 | 1/1994 | Ito . |
| 5,434,712 | 7/1995 | Ito . |
| 5,570,235 | 10/1996 | Yoneyama . |
| 5,751,498 | 5/1998 | Ito . |
| 5,900,991 | 5/1999 | Kang . |

Primary Examiner—Scott J. Sugarman
Attorney, Agent, or Firm—Greenblum & Bernstein, P.L.C.

[57] ABSTRACT

A zoom lens system including a positive first lens group and a negative second lens group, in that order form the object. The positive first lens group includes, on the most-object side, a cemented sub lens group having a negative lens element and a positive lens element. The zoom lens system satisfies the following conditions, and the order of the lens elements in the cemented sub lens group is the negative lens element and positive lens element in this order from the object:

$$-1.2 < r1/fw < -0.3 \quad (1)$$

$$-2 < fw/fc < -0.5 \quad (2)$$

$$8 < \nu N - \nu P \quad (3)$$

Wherein r1 designates the radius-of-curvature of the most-object side surface of the cemented sub lens group; fw designates the focal length of the entire lens system at the short focal length extremity; fc designates the focal length of the cemented sub lens group; $\nu N$ designates the Abbe number of the negative lens element of the cemented sub lens group; and $\nu P$ designates the Abbe number of the positive lens element of the cemented sub lens group.

7 Claims, 13 Drawing Sheets

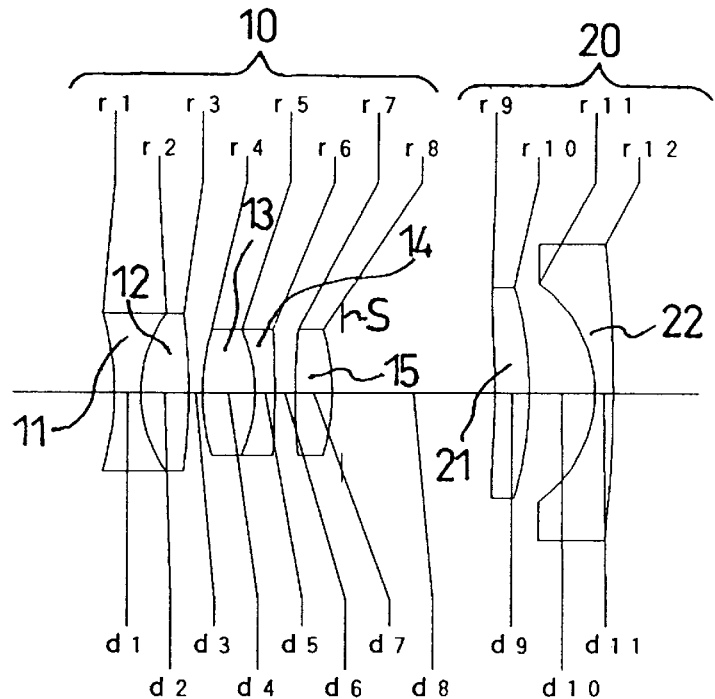
Fig. 1
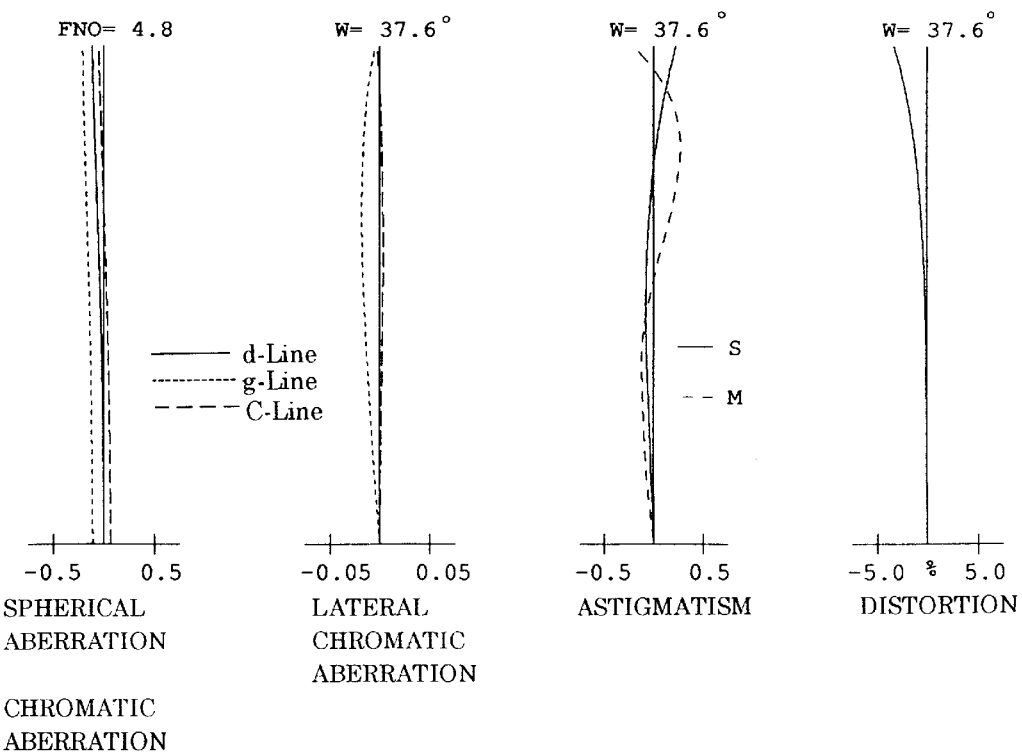
Fig. 2A — FNO=4.8 — SPHERICAL ABERRATION CHROMATIC ABERRATION
Fig. 2B — W=37.6° — LATERAL CHROMATIC ABERRATION
Fig. 2C — W=37.6° — ASTIGMATISM
Fig. 2D — W=37.6° — DISTORTION Fig. 3A  Fig. 3B  Fig. 3C  Fig. 3D
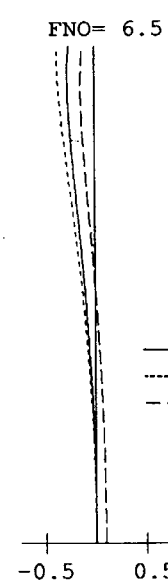
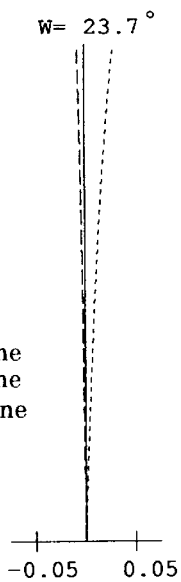
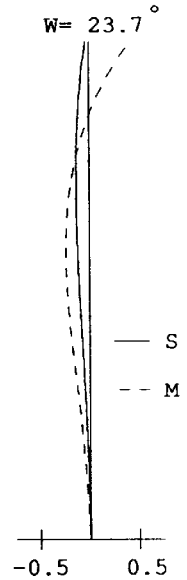
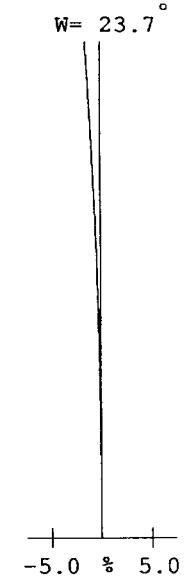
SPHERICAL ABERRATION
CHROMATIC ABERRATION
LATERAL CHROMATIC ABERRATION
ASTIGMATISM
DISTORTION
Fig. 4A  Fig. 4B  Fig. 4C  Fig. 4D
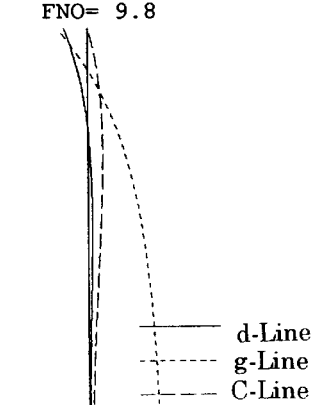
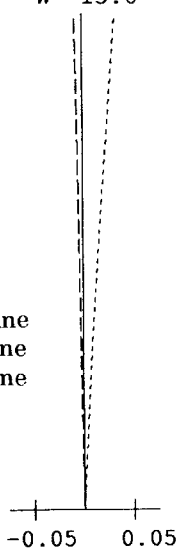
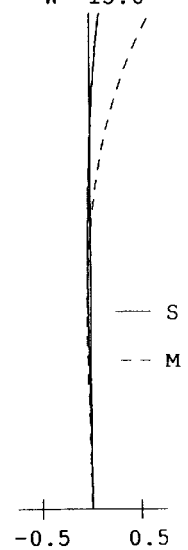
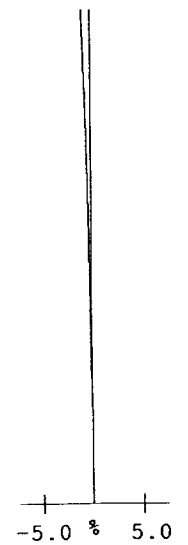
SPHERICAL ABERRATION
CHROMATIC ABERRATION
LATERAL CHROMATIC ABERRATION
ASTIGMATISM
DISTORTION

SPHERICAL
ABERRATION

CHROMATIC
ABERRATION

LATERAL
CHROMATIC
ABERRATION

ASTIGMATISM

DISTORTION

SPHERICAL ABERRATION

CHROMATIC ABERRATION

LATERAL CHROMATIC ABERRATION

ASTIGMATISM

DISTORTION

SPHERICAL ABERRATION

CHROMATIC ABERRATION

LATERAL CHROMATIC ABERRATION

ASTIGMATISM

DISTORTION

Fig. 9
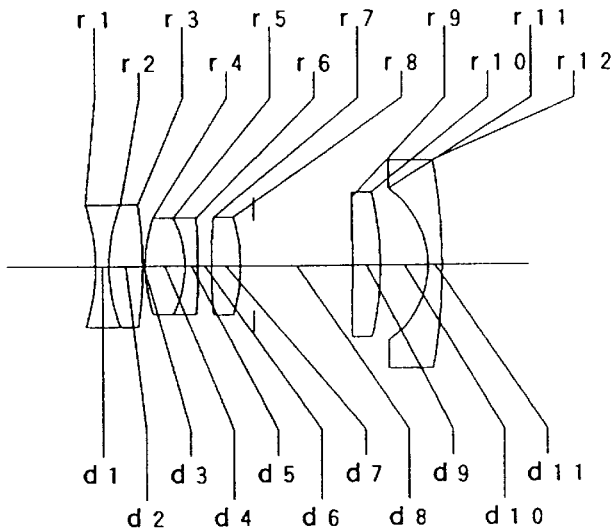
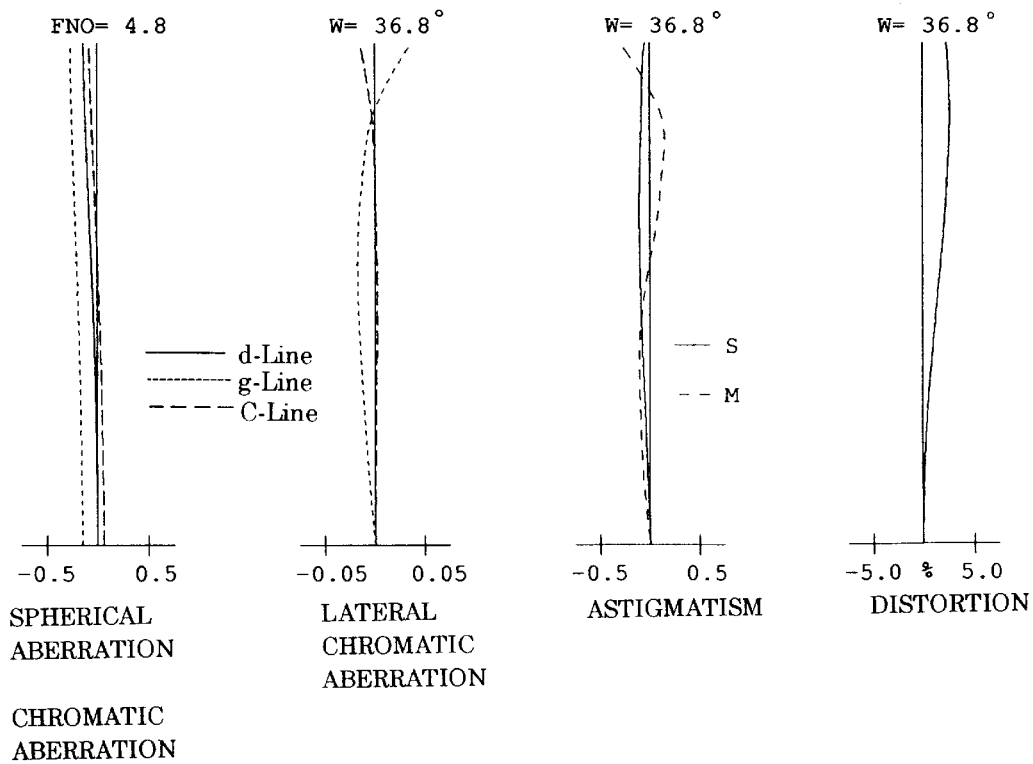
Fig. 10A    Fig. 10B    Fig. 10C    Fig. 10D
SPHERICAL
ABERRATION
CHROMATIC
ABERRATION
LATERAL
CHROMATIC
ABERRATION
ASTIGMATISM
DISTORTION

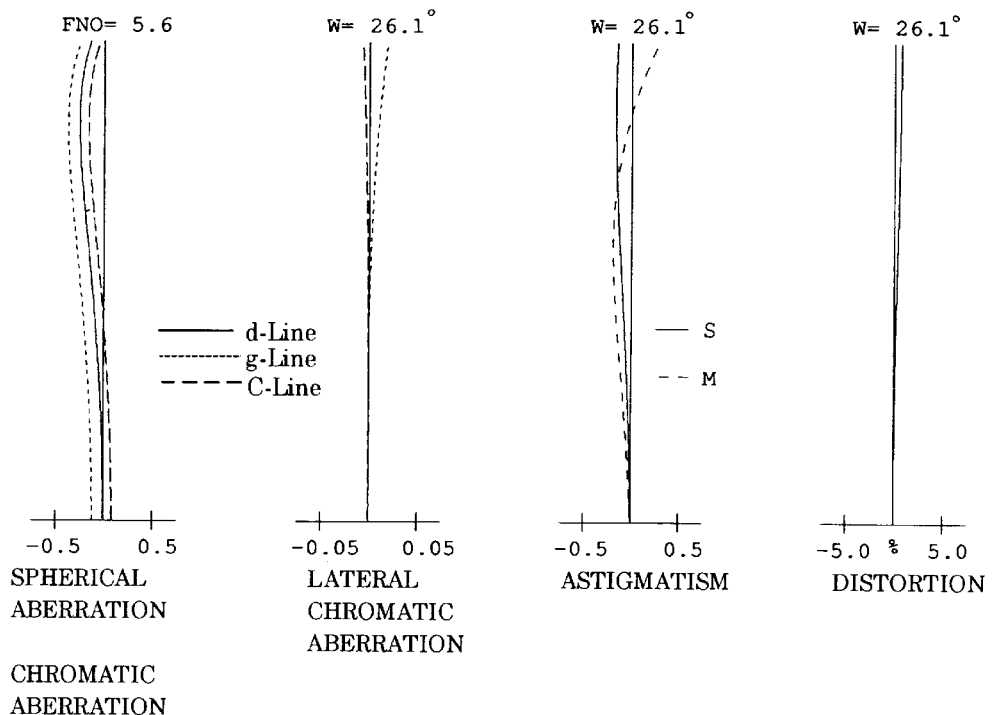
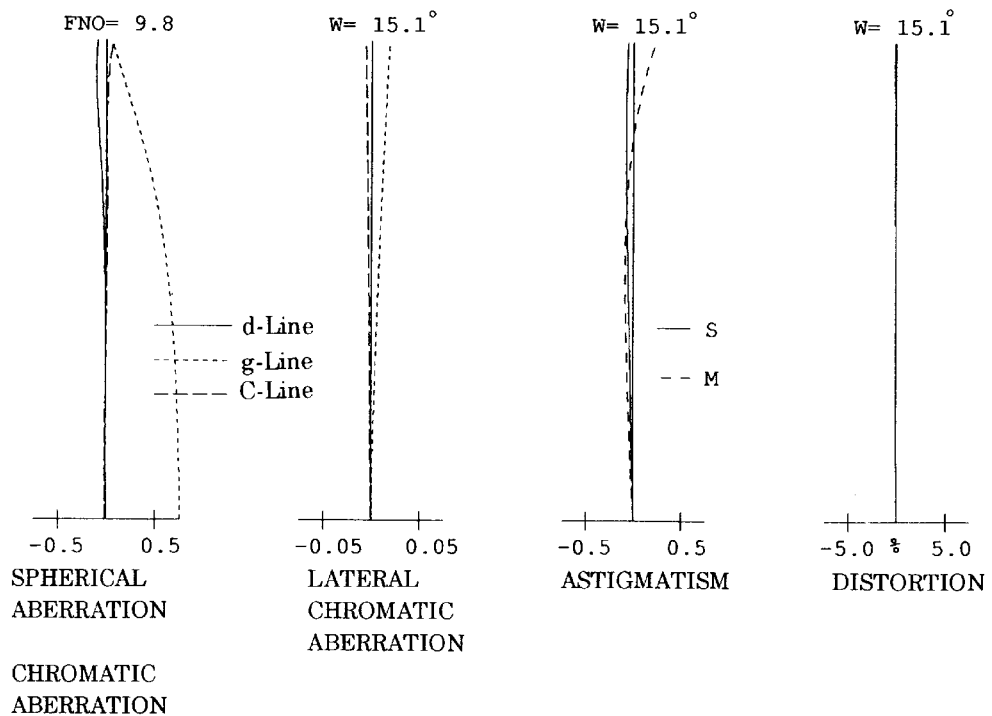

SPHERICAL ABERRATION

CHROMATIC ABERRATION

LATERAL CHROMATIC ABERRATION

ASTIGMATISM

DISTORTION

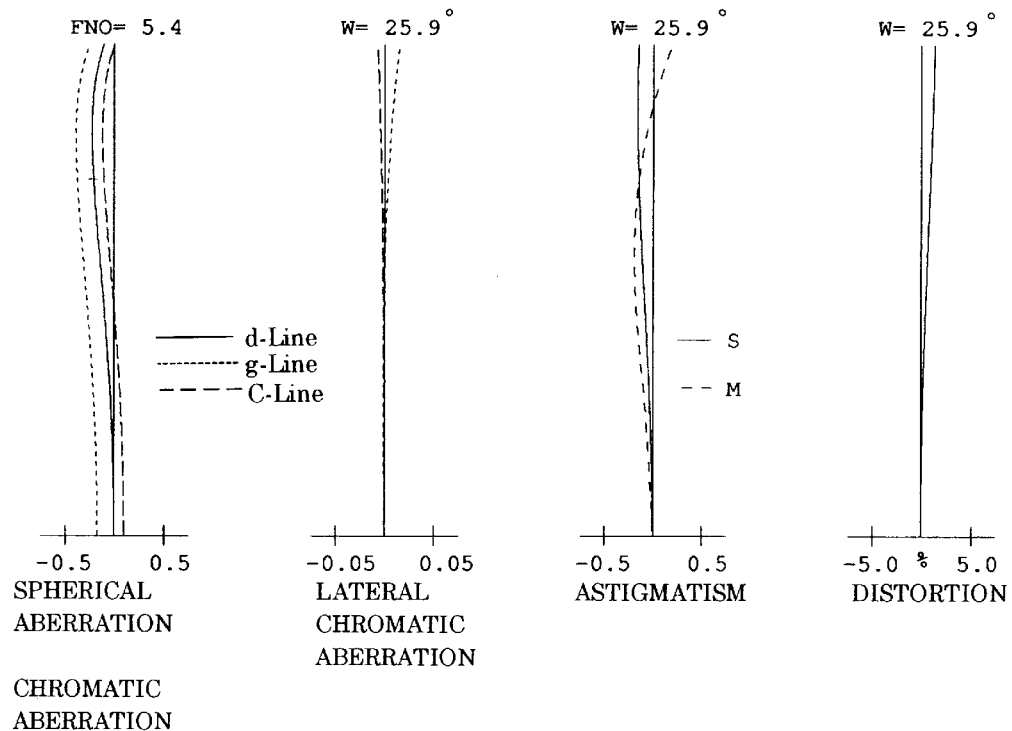
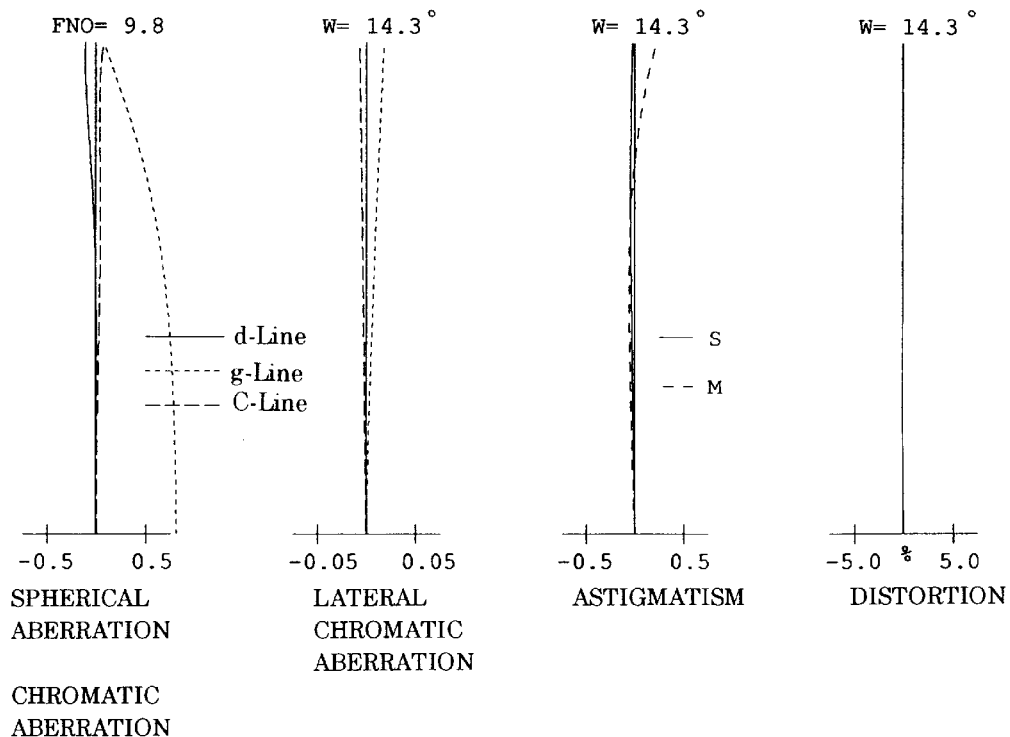

Fig. 17
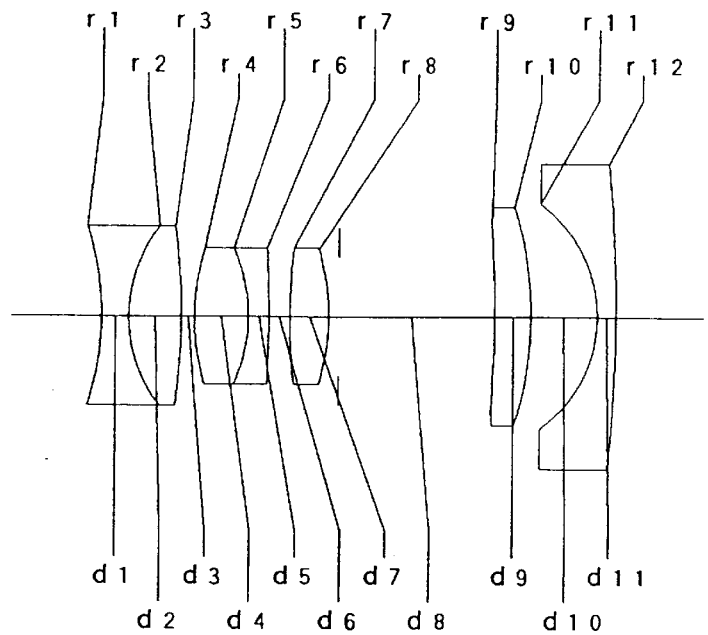
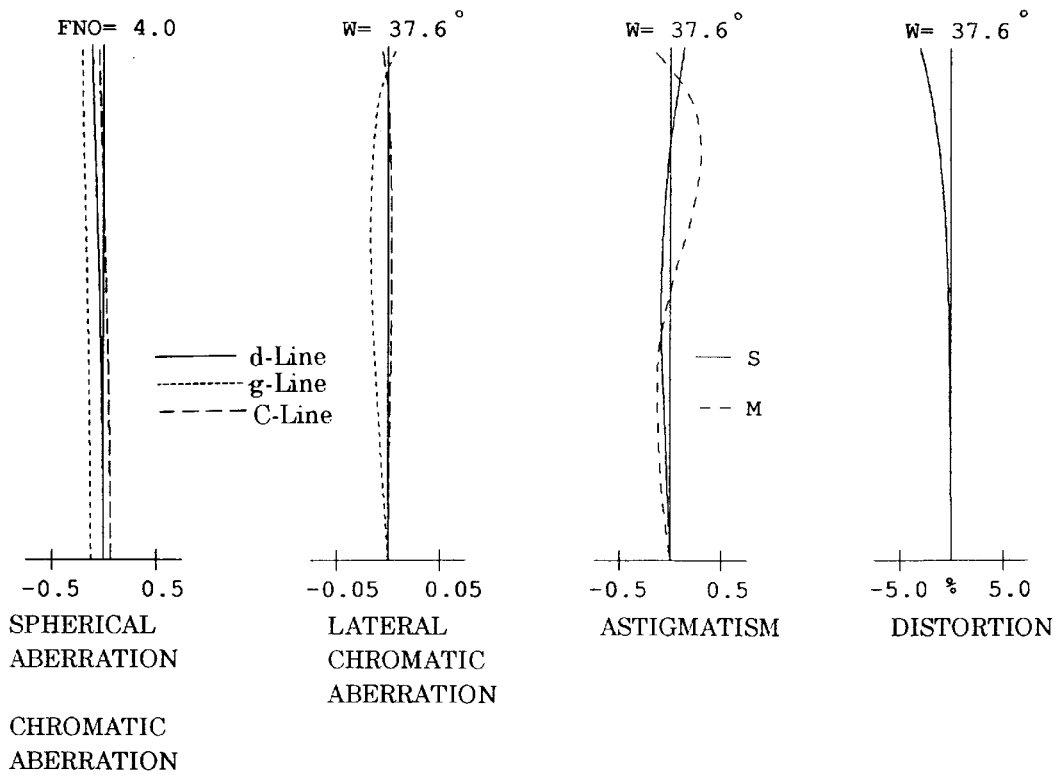
Fig. 18A    Fig. 18B    Fig. 18C    Fig. 18D

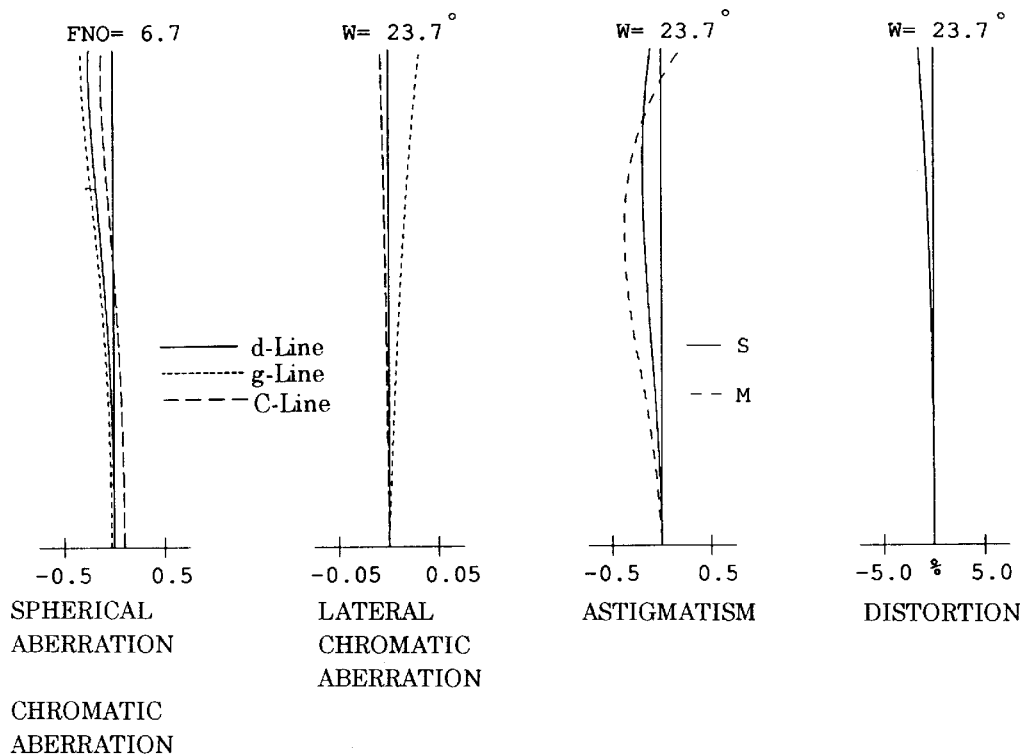
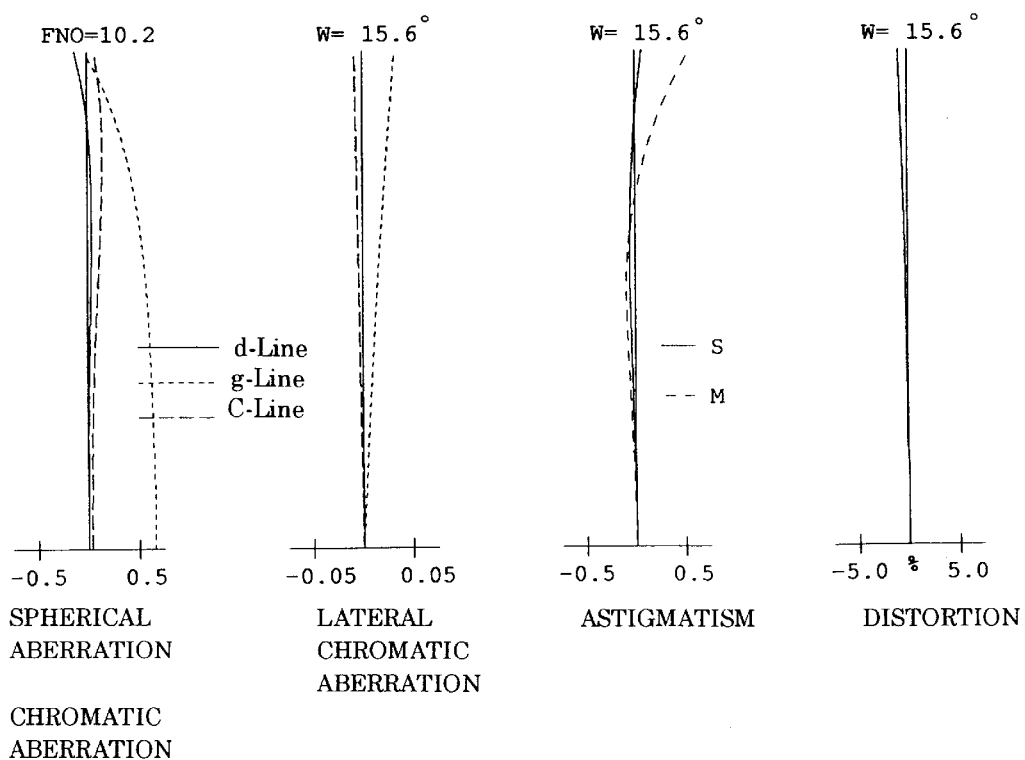

SPHERICAL ABERRATION

CHROMATIC ABERRATION

LATERAL CHROMATIC ABERRATION

ASTIGMATISM

DISTORTION

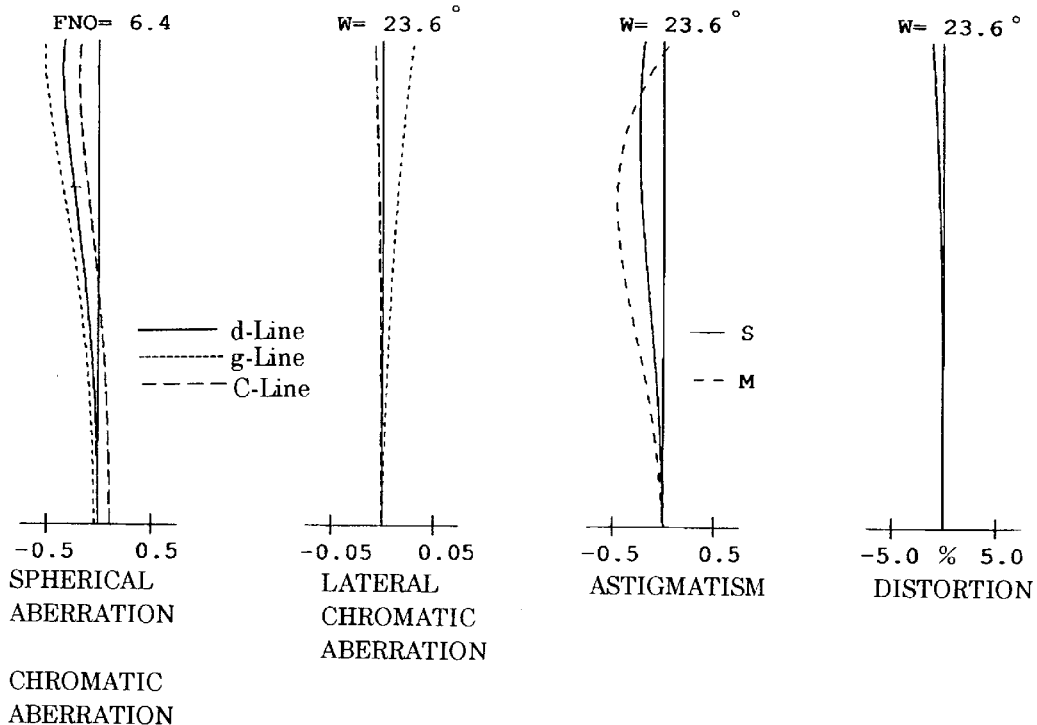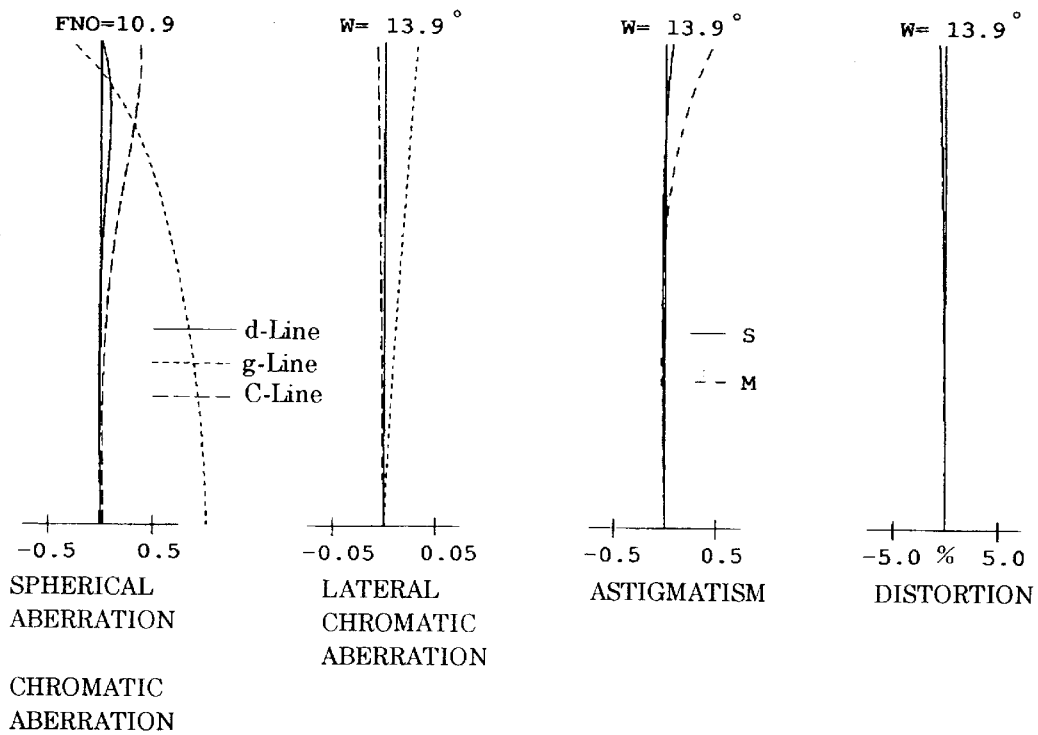

ZOOM LENS SYSTEM

BACKGROUND OF THE INVENTION

1. Field of the Invention

The present invention relates to a two-lens-group zoom lens system in which a back focal distance can be short.

2. Description of the Related Art

In a zoom lens system in which a back focal distance can be short (e.g., a zoom lens system for a compact camera), a telephoto type lens system in which a positive lens group and a negative lens group are provided in this order from the object is generally employed because the zoom lens system can dispense with a longer back focal distance unlike a zoom lens system for a single lens reflex (SLR) camera which requires a space for providing a mirror behind the photographing lens. Accordingly, in a SLR camera, a retrofocus type lens system which includes a negative lens group and a positive lens group in this order from the object is generally employed.

In a two-lens-group zoom lens system of the telephoto type, in order to adequately correct aberrations while a compact structure is maintained as well, how to distribute the refractive power (hereinafter, power) over the front and rear lens groups is an important factor. Furthermore, in order to suppress aberration-fluctuations upon zooming, aberrations have to be corrected in each lens group. However, in a zoom lens system in which the half angle-of-view at the short focal length extremity is approximately 35° and the zoom ratio is approximately 2.5, it is difficult to correct aberrations in each lens group. Due to these reasons, i.e., for an attempt to overcome the difficulties on the correcting of aberrations, the number of lens elements has to be increased, the number of cemented sub lens groups has to be increased, and then a three-lens-group zoom lens system has to be employed; and hence, the manufacturing costs increase.

SUMMARY OF THE INVENTION

It is an object of the present invention to provide a small-sized and cost-effective two-lens-group zoom lens system, with high optical performance, in which a back focal distance can be short, and which has a half angle-of-view of approximately 35° at the short focal-length extremity, and a zoom ratio of approximately 2.8.

In order to achieve the above mentioned object, there is provided a zoom lens system including a positive first lens group and a negative second lens group, in this order form the object, wherein zooming is performed by varying the distance between the positive first lens group and the negative second lens group. The positive first lens group includes, on the most-object side, a cemented sub lens group having a negative lens element and a positive lens element. The zoom lens system satisfies the following conditions, and the order of the lens elements in the cemented sub lens group is preferably the negative lens element and positive lens element in this order from the object:

$$-1.2 < r1/fw < -0.3 \quad (1)$$

$$-2 < fw/fc < -0.5 \quad (2)$$

$$8 < \nu_N - \nu_P \quad (3)$$

wherein r1 designates the radius-of-curvature of the most-object side surface of the cemented sub lens group;

fw designates the focal length of the entire lens system at the short focal length extremity;

ft designates the focal length of the cemented sub lens group;

$\nu_N$ designates the Abbe number of the negative lens element of the cemented sub lens group; and $\nu_P$ designates the Abbe number of the positive lens element of the cemented sub lens group.

The negative second lens group preferably includes a lens element having at least one aspherical surface which preferably satisfies the following condition:

$$0 < \Delta VASP < 0.3 \quad (4)$$

wherein $\Delta VASP$ designates the amount of change of distortion coefficient due to the aspherical surface under the condition that the focal length of the entire lens system at the short focal length extremity is converted to 1.0.

Furthermore, the positive first lens group preferably includes a lens element having at least one aspherical surface which preferably satisfies the following condition:

$$-30 < \Delta IASP < -10 \quad (5)$$

wherein $\Delta IASP$ designates the amount of change of spherical aberration coefficient due to the aspherical surface under the condition that the focal length of the entire lens system at the short focal length extremity is converted to 1.0.

Preferably, the positive first lens group further includes another cemented sub lens group having a positive lens element and a negative lens element.

Still further, in the zoom lens system according to the present invention, it is preferable to provide a diaphragm between the positive first lens group and the negative second lens group. The diaphragm is preferably a variable diaphragm in which the open-aperture-diameter gradually decreases from the long focal length extremity towards the short focal length extremity, or decreases in the vicinity of the short focal length extremity. This is a ountermeasure to prevent an extreme increase of the relative brightness (a smaller F-number) at the short focal length extremity. In other words, if the open-aperture-diameter of the diaphragm is determined by considering the F-number at the long focal length extremity under the condition that a wide angle-of-view is provided at the short focal length extremity and a zoom ratio is set large, the F-number at the short focal length extremity becomes unnecessarily small (the relative brightness is too high), whereby the correcting of aberrations is difficult and the diameter of the front lens group largely increases for maintaining peripheral illumination and securing an edge portion of the lens elements in the front lens group. Then, by setting the aperture diameter of the diaphragm at the short focal length extremity smaller than the aperture diameter at the long focal length extremity, aberrations are sufficiently corrected; and without making the diameter of the front lens group unnecessarily large, a wide angle-of-view at the short focal length extremity and a larger zoom ratio are obtained. With respect to the above explained variable diaphragm, a diaphragm mechanism known to those who are in the same art can be employed. Furthermore, it is preferable that a lens element having at least one aspherical surface be provided in the front lens group.

The present disclosure relates to subject matter contained in Japanese Patent Application No.10-199216 (filed on Jul. 14, 1998) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of the first embodiment of a zoom lens system according to the present invention;

FIGS. 2A, 2B, 2C and 2D are aberration diagrams, at the short focal length extremity, of the zoom lens system of FIG. 1;

FIGS. 3A, 3B, 3C and 3D are aberration diagrams, at a medium focal-length position, of the zoom lens system of FIG. 1;

FIGS. 4A, 4B, 4C and 4D are aberration diagrams, at the long focal length extremity, of the zoom lens system of FIG. 1;

FIG. 9 is a lens arrangement of the third embodiment of a zoom lens system according to the present invention;

FIGS. 10A, 10B, 10C and 10D are aberration diagrams, at the short focal length extremity, of the zoom lens system of FIG. 9;

FIGS. 11A, 11B, 11C and 11D are aberration diagrams, at a medium focal-length position, of the zoom lens system of FIG. 9;

FIGS. 12A, 12B, 12C and 12D are aberration diagrams, at the long focal length extremity, of the zoom lens system of FIG. 9;

FIGS. 15A, 15B, 15C and 15D are aberration diagrams, at a medium focal-length position, of the zoom lens system of FIG. 13;

FIGS. 16A, 16B, 16C and 16D are aberration diagrams, at the long focal length extremity, of the zoom lens system of FIG. 13;

FIG. 17 is a lens arrangement of the fifth embodiment of a zoom lens system according to the present invention;

FIGS. 18A, 18B, 18C and 18D are aberration diagrams, at the short focal length extremity, of the zoom lens system of FIG. 17;

FIGS. 19A, 19B, 19C and 19D are aberration diagrams, at a medium focal-length position, of the zoom lens system of FIG. 17;

FIGS. 20A, 20B, 20C and 20D are aberration diagrams, at the long focal length extremity, of the zoom lens system of FIG. 17;

FIGS. 23A, 23B, 23C and 23D are aberration diagrams, at a medium focal-length position, of the zoom lens system of FIG. 21;

FIGS. 24A, 24B, 24C and 24D are aberration diagrams, at the long focal length extremity, of the zoom lens system of FIG. 21.

DESCRIPTION OF THE PREFERRED EMBODIMENTS

Figure 25:
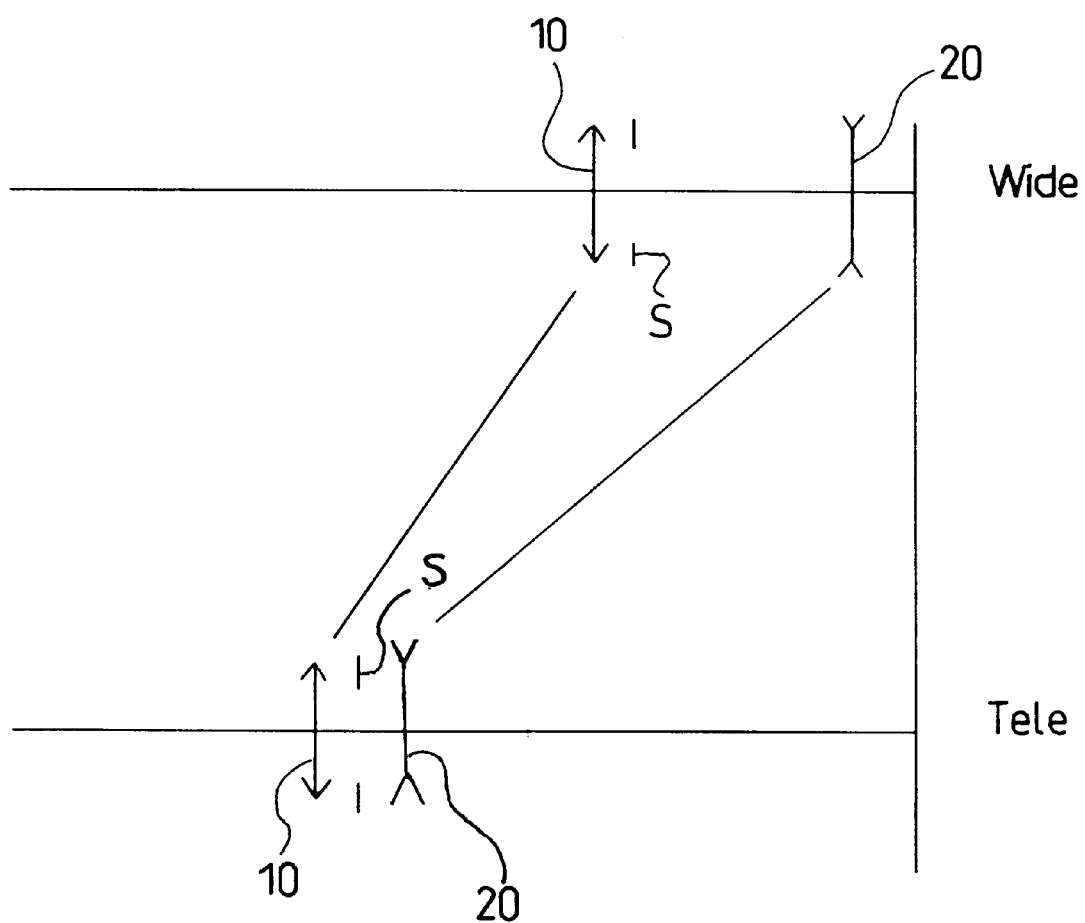
FIG. 25 is the moving paths the of the zoom lens system according to the present invention.

As shown in FIG. 25, the zoom lens includes a positive first lens group 10, a diaphragm S, and a negative second lens group 20 in this order from the object. When zooming is performed from the short focal length extremity towards the long focal length extremity, the first lens group 10 and the second lens group 20 move together towards the object while the distance therebetween is reduced, and the diaphragm S moves integrally with the positive first lens group 10 upon zooming. Focusing is performed by the first lens group, and the diaphragm S does not move during the focusing operation.

In a two-lens-group zoom lens system, in order to suppress aberration-fluctuations at all the focal length positions from the short focal length extremity towards the long focal length extremity and to maintain aberrations adequately, it is important to correct aberrations in each lens group. On the other hand, in order to reduce the influence on aberration due to a wide angle-of-view at the short focal length extremity, it is effective to correct aberrations at a position which is as close to the object as possible. To comply with this requirement, in the embodiments which will be explained, the most-object side lens elements are formed as a cemented sub lens group. With appropriate conditions for the cemented sub lens group, aberration caused by a wide angle-of-view at the short focal length extremity is satisfactorily suppressed in the positive first (front) lens group whereby a small-sized and cost-effective two-lens-group zoom lens system, with high optical performance, in which a back focal distance can be short, is obtained.

If another cemented sub lens group having a positive lens element and a negative lens element is provided in the first lens group, it is advantageous to correct aberrations. In addition, it is preferable to have a lens element having at least one aspherical surface in the negative second (rear) lens group.

Condition (1) specifies the radius of curvature of the most object-side surface (the first surface) of the most objective-side cemented sub lens group. By satisfying condition (1), a wide angle-of-view at the short focal length extremity can be achieved.

If r1/fw exceeds the upper limit of condition (1), the radius of curvature of the first surface of the cemented sub lens group becomes small whereby aberrations increase, and the correcting thereof becomes difficult. If r1/fw exceeds the lower limit of condition (1), a wide angle-of-view at the short focal length extremity cannot be achieved.

Condition (2) specifies the power of the cemented sub lens group. By satisfying condition (2), a wide angle-of-view at the short focal length extremity can be achieved.

If fw/fc exceeds the upper limit of condition (2), a wide angle-of-view at the short focal length extremity cannot be achieved.

If fw/fc exceeds the lower limit of condition (2), the power of the cemented sub lens group becomes too strong, whereby aberrations increase and the correcting thereof becomes difficult.

Condition (3) specifies the Abbe numbers of the negative lens element and the positive lens element in the most object-side cemented sub lens group in the first lens group. By satisfying condition (3), at all the focal length areas from the short focal length extremity towards the long focal length extremity, chromatic aberration is satisfactorily corrected.

If νN−νP exceeds the lower limit of condition (3), chromatic aberrations cannot be corrected satisfactorily from the short focal length extremity towards the long focal length extremity.

Condition (4) specifies the amount of asphericity of the aspherical surface. By satisfying condition (4), distortion can be satisfactorily corrected.

If ΔVASP exceeds the upper limit of condition (4), the mount of asphericity becomes large, so that the manufacturing of the lens element on which the aspherical surface is formed is difficult. If ΔVASP exceeds the lower limit of condition (4), the correcting of distortion through the aspherical surface has little effect whereby distortion cannot be satisfactorily corrected.

Condition (5) specifies the amount of asphericity of the aspherical surface. By satisfying condition (5), spherical aberration can be satisfactorily corrected.

If ΔIASP exceeds the upper limit of condition (5), the correcting of spherical aberration through the aspherical surface has little effect whereby spherical aberration cannot be satisfactorily corrected.

If ΔIASP exceeds the lower limit of condition (5), the amount of asphericity becomes large to the extent that the manufacturing of a lens element on which the aspherical surface is formed is difficult.

The relation between the aspherical coefficients and the aberration coefficients will be herein discussed. The shape of the aspherical surface can be generally defined as follows:

$$x = cy^2/\{1+[1-(1+K)c^2y^2]^{1/2}\} + A4y^4 + A6y^6 + A8y^8 + A10y^{10} + \ldots$$

wherein:
x designates a distance from a tangential plane of an aspherical vertex;
y designates a distance from the optical axis;
c designates a curvature of the aspherical vertex (1/R),
K designates a conic constant;
A4 designates a fourth-order aspherical coefficient;
A6 designates a sixth-order aspherical coefficient;
A8 designates a eighth-order aspherical coefficient; and
A10 designates a tenth-order aspherical coefficient.

In this equation, to obtain the aberration coefficients, the following substitution is made to replace K with "0" (Bi=Ai when K=0).

$B4 = A4 + Kc^3/8$
$B6 = A6 + (K^2 + 2K)c^5/16$
$B8 = A8 + 5(K^3 + 3K^2 3K)c^7/128$
$B10 = A10 + 7(K^4 + 4K^3 + 6K^2 + 4K)c^9/256$

Hence, the following equation is obtained:

$$x = cy^2/\{1+[1-c^2y^2]^{1/2}\} + B4y^4 + B6y^6 + B8y^8 + B10y^{10} + \ldots$$

When the focal length f is normalized to 1.0, the resultant value is transformed as shown below. Namely, the following equations are substituted into the above equation:

$X = x/f, Y = y/f, C = fc$ $\alpha 4 = f^3 B4, \alpha 6 = f^5 B6, \alpha 8 = f^7 B8, \alpha 10 = f^9 B10$ Accordingly, the following equation is obtained.

$$X = CY^2/\{1+[1-C^2Y^2]^{1/2}\} + \alpha 4 Y^4 + \alpha 6 Y^6 + 8Y^8 + \alpha 10 Y^{10} + \ldots$$

The second and subsequent terms define the amount of asphericity of the aspherical surface.

Then the third order aberration contributions due to the fourth order aspherical coefficient α4 are obtained as follows:

$\Delta I = h^4 \phi$ $\Delta II = h^3 k \phi$ $\Delta III = h^2 k^2 \phi$ $\Delta IV = h^2 k^2 \phi$ $\Delta V = h k^3 \phi$ wherein
I designates the spherical aberration coefficient;
II designates the coma coefficient;
III designates the astigmatism coefficient;
IV designates the sagittal field of curvature coefficient;
V designates the distortion coefficient;
h1 designates the height at which a paraxial on-axis ray strikes the first surface of an optical system including an aspherical surface;
h designates the height at which the paraxial on-axis ray strikes the aspherical surface of the optical system when h1 is 1 (one);
k1 designates the height at which a paraxial off-axis ray, which comes from an off-axis object point and passes through the center of the entrance pupil, strikes the first surface of an optical system including an aspherical surface;
k designates the height at which the paraxial off-axis ray strikes the aspherical surface of the optical system when k1 is −1 (minus one); and $\phi = 8(N'-N)\alpha 4$ wherein
N designates the refractive index of a medium on the side of the object with respect to the aspherical surface;
N' designates the refractive index of a medium on the side of the image with respect to the aspherical surface.

Specific numerical data of the embodiments will be described below via the tables and diagrams. In the diagrams of chromatic aberration (axial chromatic aberration) represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. FNO designates the F-number, f designates the focal length of the entire zoom lens system, W designates the half angle-of-view, and fB designates the back focal distance. R designates the radius of curvature of each lens surface, D designates the lens thickness or distance, Nd designates refractive index with respect to the d-line, νd designates the Abbe number.

In addition to the above, an aspherical surface which is symmetrical with respect to the optical axis is defined as follows:

$x = Ch^2/\{1+[1-(1+K)C^2h^2]^{1/2}\} + A4h^4 + A6h^6 + A8h^8 + A10h^{10}$ wherein:
x designates a distance from a tangential plane of an aspherical vertex;
C designates a curvature of the aspherical vertex (1/R);
h designates a distance from the optical axis;
K designates the conic coefficient; and
A4 designates a fourth-order aspherical coefficient;
A6 designates a sixth-order aspherical coefficient;
A8 designates a eighth-order aspherical coefficient;
A10 designates a tenth-order aspherical coefficient.

Embodiment 1

FIG. 1 shows a lens arrangement of the first embodiment of a zoom lens system including a positive first lens group 10, a diaphragm S and a negative second lens group 20, in this order from the object. The first lens group 10 includes a cemented sub lens group having a negative biconcave single lens element 11 and a positive biconvex single lens element 12, a cemented sub lens group having a positive biconvex single lens element 13 and a negative single lens element 14, and a positive single lens element 15, in this order from the object. The second lens group 20 includes a negative meniscus lens element 21 having a concave surface on the object side, and a negative meniscus lens element 22 having a concave surface on the object side. FIGS. 2A through 2D, 3A through 3D, and 4A through 4D show aberration diagrams, at the short focal length extremity, a medium focal length position, and the long focal length extremity, respectively, of the lens arrangement shown in FIG. 1. Table 1 shows the numerical data thereof including data indicating the values of open-aperture-diameter of the variable diaphragm S.

[Table 1]

$F_{NO}=1:4.8\sim6.5\sim9.8$
$f=29.00\sim50.00\sim78.00$ (Zoom Ratio=2.69)
$W=37.6°\sim23.7°\sim15.6°$
$f_B=8.30\sim29.41\sim57.55$
Open-Aperture-Diameter of The Diaphragm S=ø7.2~ø9.1

| Surface No. | R | D | Nd | v d |
|---|---|---|---|---|
| 1 | −21.161 | 2.00 | 1.83481 | 42.7 |
| 2 | 10.268 | 3.64 | 1.71983 | 29.1 |
| 3 | −49.423 | 1.07 | — | — |
| 4 | 16.634 | 3.98 | 1.48749 | 70.2 |
| 5 | −11.930 | 1.50 | 1.84500 | 24.0 |
| 6 | −91.891 | 1.54 | — | — |
| 7 | 51.750 | 2.83 | 1.73077 | 40.5 |
| 8* | −16.950 | 0.75 | — | — |
| Diaphragm | ∞ | 11.69~5.42~2.30 | — | — |
| 9* | −63.533 | 2.69 | 1.58547 | 29.9 |
| 10 | −28.012 | 5.12 | — | — |
| 11 | −10.003 | 1.40 | 1.69680 | 55.5 |
| 12 | −106.461 | — | — | — |

* designates the aspherical surface which is symmetrical with respect to the optical axis.
Aspherical surface data (the aspherical surface coefficients not indicated are zero (0.00)):

| Surface No. | K | A4 | A6 | A8 |
|---|---|---|---|---|
| 8 | 0.00 | $0.5761 \times 10^{-4}$ | $-0.7034 \times 10^{-7}$ | $0.1382 \times 10^{-8}$ |
| 9 | 0.00 | $0.6248 \times 10^{-4}$ | $-0.3904 \times 10^{-7}$ | $0.6182 \times 10^{-8}$ |

Embodiment 2

Figure 5:
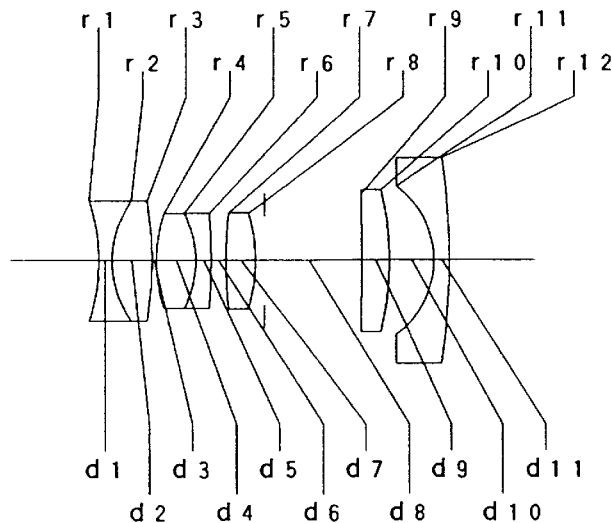
FIG. 5 a lens arrangement of the second embodiment of a zoom lens system according to the present invention.
Figure 6A:
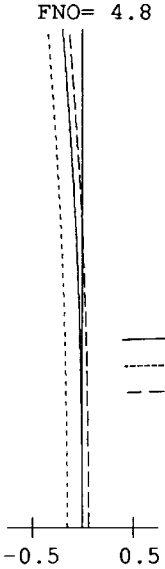
FIGS. 6A, 6B, 6C and 6D are aberration diagrams, at the short focal length extremity, of the zoom lens system of FIG. 5.
Figure 6B:
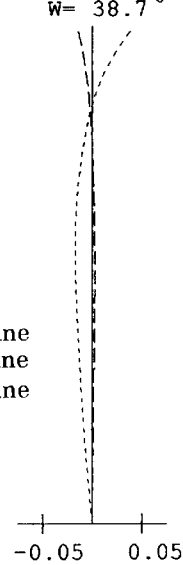
Figure 6C:
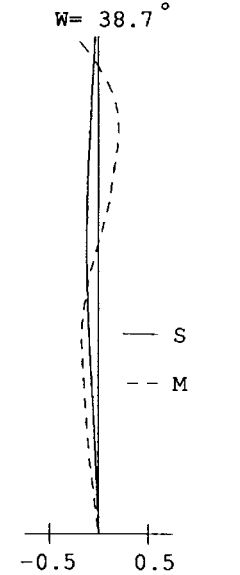
Figure 6D:
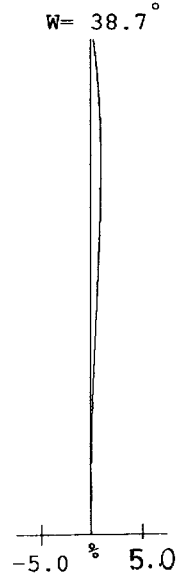
Figure 7A:
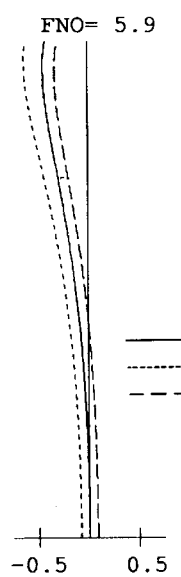
FIGS. 7A, 7B, 7C and 7D are aberration diagrams, at a medium focal-length position, of the zoom lens system of FIG. 5.
Figure 7B:
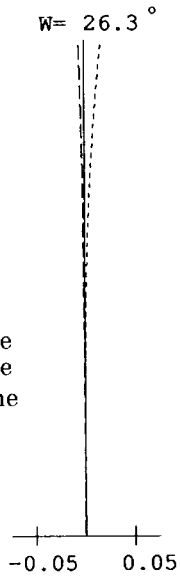
Figure 7C:
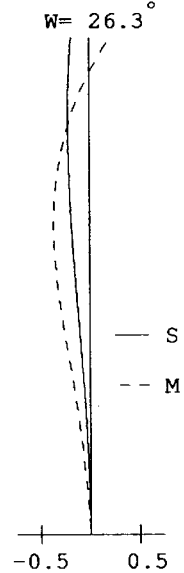
Figure 7D:
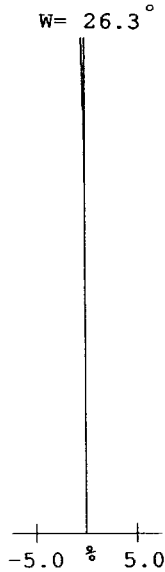
Figure 8A:
FIGS. 8A, 8B, 8C and 8D are aberration diagrams, at he long focal length extremity, of the zoom lens system of FIG. 5.
Figure 8B:
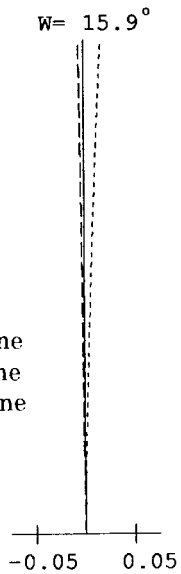
Figure 8C:
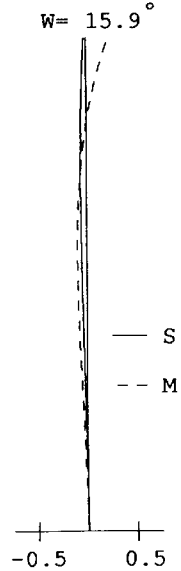
Figure 8D:
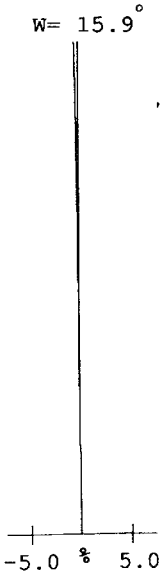

FIG. 5 shows a lens arrangement of the second embodiment of a zoom lens system. FIGS. 6A through 6D, 7A through 7D, and 8A through 8D show aberration diagrams, at the short focal length extremity, a medium focal length position, and the long focal length extremity, respectively, of the lens arrangement shown in FIG. 5. Table 2 shows the numerical data thereof. The lens arrangement of FIG. 5 is substantially the same as that of the first embodiment.

[Table 2]

$F_{NO}=1:4.8\sim5.9\sim9.8$
$f=21.50\sim35.00\sim61.00$ (Zoom Ratio=2.84)
$W=38.7°\sim26.3°\sim15.9°$
$f_B=6.22\sim18.62\sim42.49$
open-Aperture-Diameter of The Diaphragm S=ø5.3~ø7.0

| Surface No. | R | D | Nd | v d |
|---|---|---|---|---|
| 1 | −15.374 | 1.00 | 1.83481 | 42.7 |
| 2 | 8.292 | 3.03 | 1.69657 | 33.3 |
| 3 | −31.803 | 0.35 | — | — |
| 4 | 11.971 | 3.02 | 1.48749 | 70.2 |
| 5 | −8.189 | 1.16 | 1.84499 | 28.4 |
| 6 | −49.698 | 1.14 | — | — |
| 7 | 36.776 | 2.26 | 1.73077 | 40.5 |
| 8* | −12.326 | 0.65 | — | — |
| Diaphragm | ∞ | 7.57~4.12~1.77 | — | — |
| 9* | −63.046 | 2.10 | 1.58547 | 29.9 |
| 10 | −23.439 | 3.50 | — | — |
| 11 | −7.143 | 1.20 | 1.78823 | 47.6 |
| 12 | −55.882 | — | — | — |

* designates the aspherical surface which is symmetrical with respect to the optical axis.
Aspherical surface data (the aspherical surface coefficients not indicated are zero (0.00)):

| Surface No. | K | A4 | A6 | A8 |
|---|---|---|---|---|
| 8 | 0.00 | $0.1509 \times 10^{-3}$ | $-0.8483 \times 10^{-6}$ | $0.2893 \times 10^{-7}$ |
| 9 | 0.00 | $0.1896 \times 10^{-3}$ | $-0.9211 \times 10^{-6}$ | $0.7529 \times 10^{-7}$ |

Embodiment 3

FIG. 9 shows a lens arrangement of the third embodiment of a zoom lens system. FIGS. 10A through 10D, 11A through 11D, and 12A through 12D show aberration diagrams, at the short focal length extremity, a medium focal length position, and the long focal length extremity, respectively, of the lens arrangement shown in FIG. 9. Table 3 shows the numerical data thereof. The lens arrangement of FIG. 9 is substantially the same as that of the first embodiment.

[Table 3]

$F_{NO}=1:4.8\sim5.6\sim9.8$
$f=22.50\sim35.00\sim64.00$ (Zoom Ratio=2.84)

W=36.8°~26.1°~15.1°
fB=6.23~17.48~43.57
Open-Aperture-Diameter of The Diaphragm S=ø5.3~ø6.9

| Surface No. | R | D | Nd | ν d |
|---|---|---|---|---|
| 1 | −14.416 | 1.00 | 1.83481 | 42.7 |
| 2 | 12.959 | 2.58 | 1.70484 | 32.7 |
| 3 | −31.559 | 0.20 | — | — |
| 4 | 12.090 | 3.01 | 1.48749 | 70.2 |
| 5 | −8.244 | 1.00 | 1.84500 | 30.0 |
| 6 | −52.132 | 1.02 | — | — |
| 7 | 38.211 | 2.23 | 1.73077 | 40.5 |
| 8* | −12.650 | 1.00 | — | — |
| Diaphragm | ∞ | 7.51~4.08~1.29 | — | — |
| 9* | −67.295 | 2.13 | 1.58547 | 29.9 |
| 10 | −23.254 | 3.63 | — | — |
| 11 | −7.143 | 1.10 | 1.79577 | 47.1 |
| 12 | −45.934 | — | — | — |

* designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | 0.1560 × 10⁻³ | −0.2318 × 10⁻⁶ | 0.1198 × 10⁻⁷ |
| 9 | 0.00 | 0.1758 × 10⁻³ | 0.4913 × 10⁻⁶ | 0.5024 × 10⁻⁷ |

Embodiment 4

Figure 13:
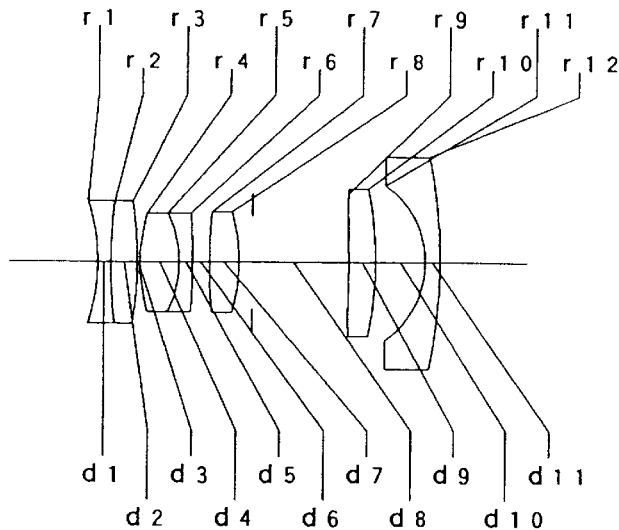
FIG. 13 is a lens arrangement of the fourth embodiment of a zoom lens system according to the present invention.
Figures 14A, 14B, 14C, 14D:
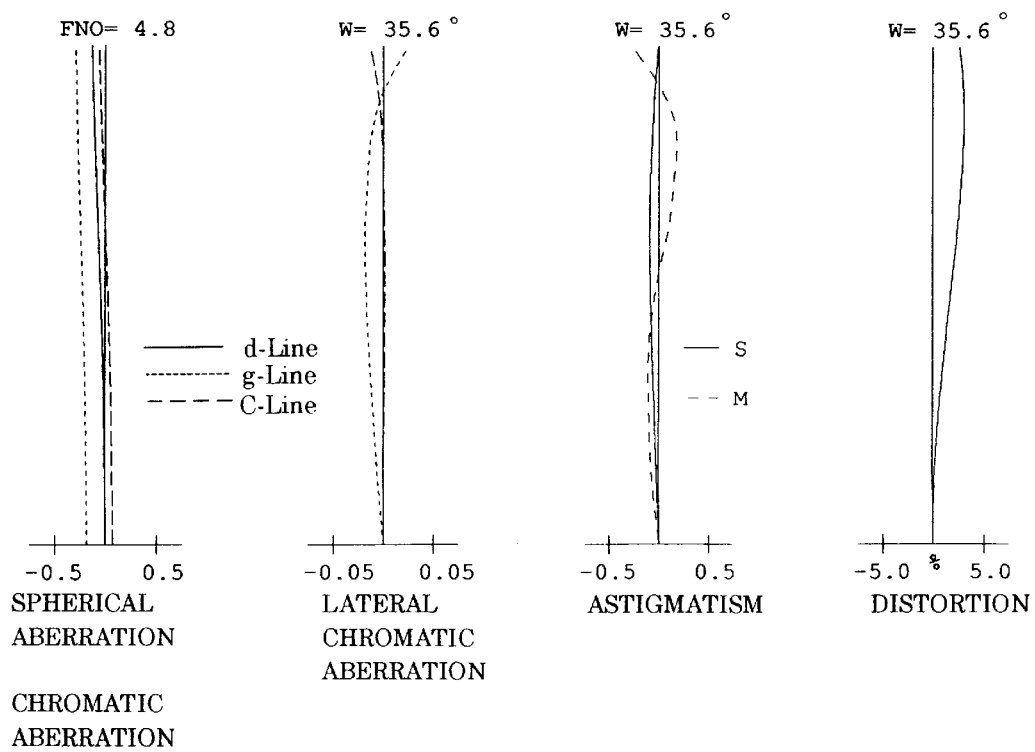
FIGS. 14A, 14B, 14C and 14D are aberration diagrams, at the short focal length extremity, of the zoom lens system of FIG. 13.

FIG. 13 shows a lens arrangement of the fourth embodiment of a zoom lens system. FIGS. 14A through 14D, 15A through 15D, and 16A through 16D show aberration diagrams, at the short focal length extremity, a medium focal length position, and the long focal length extremity, respectively, of the lens arrangement shown in FIG. 13. Table 4 shows the numerical data thereof. The lens arrangement of FIG. 13 is substantially the same as that of the first embodiment.

[Table 4]
F$_{NO}$=1:4.8~5.4~9.8
f=23.50~35.00~67.50 (Zoom Ratio=2.87)
W=35.6°~25.9°~14.3°
fB=6.26~16.20~44.28
open-Aperture-Diameter of The Diaphragm S=ø5.3~ø6.9

| Surface No. | R | D | Nd | ν d |
|---|---|---|---|---|
| 1 | −14.651 | 1.00 | 1.83500 | 42.8 |
| 2 | 39.243 | 2.01 | 1.70281 | 29.8 |
| 3 | −30.796 | 0.20 | — | — |
| 4 | 12.925 | 2.95 | 1.48749 | 70.2 |
| 5 | −8.342 | 1.00 | 1.84499 | 31.5 |
| 6 | −56.286 | 1.30 | — | — |
| 7 | 39.468 | 2.22 | 1.73077 | 40.5 |
| 8* | −12.913 | 1.00 | — | — |
| Diaphragm | ∞ | 7.34~4.28~1.26 | — | — |
| 9* | −65.073 | 2.05 | 1.58547 | 29.9 |
| 10 | −26.339 | 3.81 | — | — |
| 11 | −7.143 | 1.15 | 1.80570 | 46.5 |
| 12 | −37.170 | — | — | — |

* designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | 0.1469 × 10⁻³ | −0.3340 × 10⁻⁶ | 0.1196 × 10⁻⁷ |
| 9 | 0.00 | 0.1849 × 10⁻³ | 0.4746 × 10⁻⁶ | 0.5141 × 10⁻⁷ |

Embodiment 5

FIG. 17 shows a lens arrangement of the fifth embodiment of a zoom lens system. FIGS. 18A through 18D, 19A through 19D, and 20A through 20D show aberration diagrams, at the short focal length extremity, a medium focal length position, and the long focal length extremity, respectively, of the lens arrangement shown in FIG. 17. Table 5. shows the numerical data thereof. The lens arrangement of FIG. 17 is substantially the same as that of the first embodiment; however, the value of open-aperture-diameter of the diaphragm S is fixed.

[Table 5]
F$_{NO}$=1:4.0~6.7~10.2
f=29.00~50.00~78.00 (Zoom Ratio=2.69)
W=37.6°~23.7°~15.6°
fB=8.30~29.43~57.60
Open-Aperture-Diameter of the Diaphragm S=ø8.7 (fixed)

| Surface No. | R | D | Nd | ν d |
|---|---|---|---|---|
| 1 | −21.268 | 2.00 | 1.83481 | 42.7 |
| 2 | 10.807 | 3.89 | 1.72426 | 28.9 |
| 3 | −48.451 | 0.99 | — | — |
| 4 | 16.848 | 3.98 | 1.48749 | 70.2 |
| 5 | −11.812 | 1.50 | 1.84500 | 24.3 |
| 6 | −96.863 | 1.57 | — | — |
| 7 | 51.750 | 2.83 | 1.73077 | 40.5 |
| 8* | −16.950 | 0.75 | — | — |
| Diaphragm | ∞ | 11.64~5.39~2.30 | — | — |
| 9* | −55.741 | 2.69 | 1.58547 | 29.9 |
| 10 | −26.559 | 5.07 | — | — |
| 11 | −10.057 | 1.40 | 1.69680 | 55.5 |
| 12 | −109.185 | — | — | — |

* designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | 0.5761 × 10⁻⁴ | −0.7034 × 10⁻⁷ | 0.1382 × 10⁻⁸ |
| 9 | 0.00 | 0.6213 × 10⁻⁴ | −0.6701 × 10⁻⁷ | 0.6169 × 10⁻⁸ |

Embodiment 6

Figure 21:
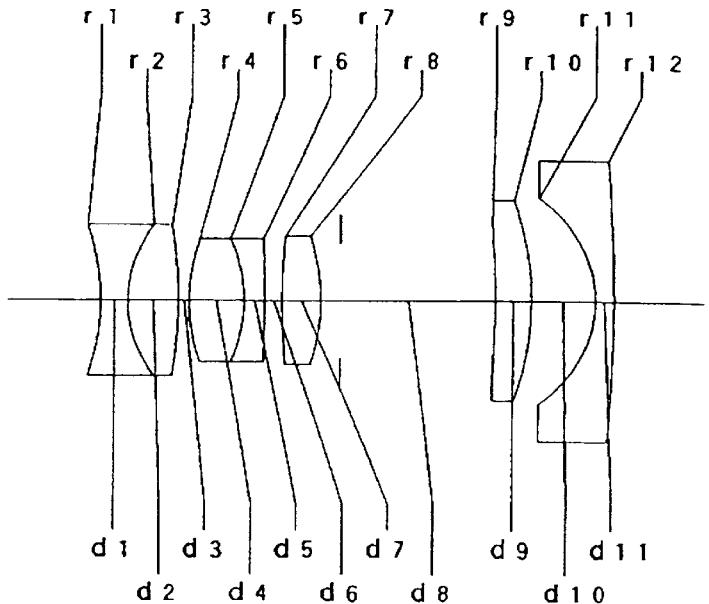
FIG. 21 is a lens arrangement of the sixth embodiment of a zoom lens system according to the present invention.
Figures 22A, 22B, 22C, 22D:
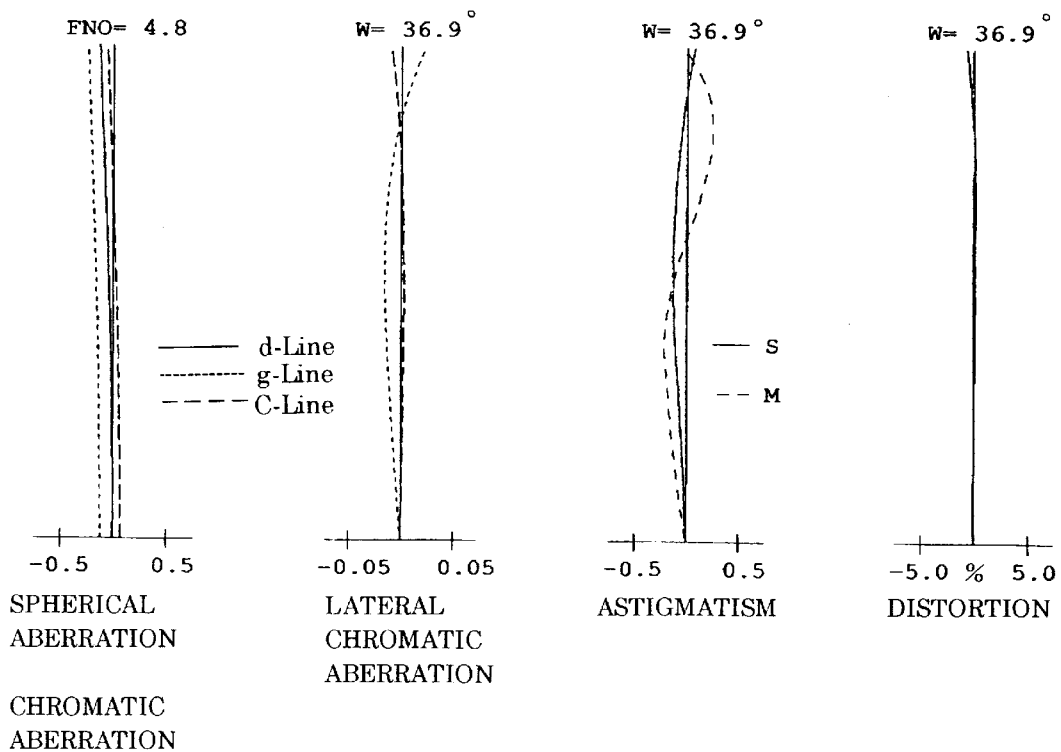
FIGS. 22A, 22B, 22C and 22D are aberration diagrams, at the short focal length extremity, of the zoom lens system of FIG. 21.

FIG. 21 shows a lens arrangement of the sixth embodiment of a zoom lens system. FIGS. 22A through 22D, 23A through 23D, and 24A through 24D show aberration diagrams, at the short focal length extremity, a medium focal length position, and the long focal length extremity, respectively, of the lens arrangement shown in FIG. 21. Table 6 shows the numerical data thereof. The lens arrangement of FIG. 21 is substantially the same as that of the first embodiment.

[Table 6]
$F_{NO}$=1:4.8~6.4~10.9
f=29.00~50.00~88.00 (Zoom Ratio=3.03)
w=36.9°~23.6°~13.9°
$f_B$=8.35~29.30~67.20
Open-Aperture-Diameter of The Diaphragm S=ø7.0~ø9.1

| Surface, No. | R | D | Nd | v d |
|---|---|---|---|---|
| 1 | −19.704 | 2.00 | 1.83481 | 42.7 |
| 2 | 10.351 | 3.68 | 1.70119 | 29.9 |
| 3 | −40.917 | 0.81 | — | — |
| 4 | 16.484 | 3.98 | 1.48749 | 70.2 |
| 5 | −12.489 | 1.50 | 1.84500 | 24.1 |
| 6 | −97.314 | 1.25 | — | — |
| 7 | 51.750 | 2.83 | 1.73077 | 40.5 |
| 8* | −16.950 | 1.40 | — | — |
| Diaphragm | ∞ | 11.45~5.23~1.52 | — | — |
| 9* | −59.035 | 2.69 | 1.58547 | 29.9 |
| 10 | −24.859 | 4.72 | — | — |
| 11 | −10.091 | 1.40 | 1.71757 | 53.3 |
| 12 | −136.037 | — | — | — |

\* designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | $0.5761 \times 10^{-4}$ | $-0.7034 \times 10^{-7}$ | $0.1382 \times 10^{-8}$ |
| 9 | 0.00 | $0.6345 \times 10^{-4}$ | $-0.1911 \times 10^{-6}$ | $0.7000 \times 10^{-8}$ |

Table 7 shows numerical values for each condition for each embodiment.

TABLE 7

| | Cond. (1) | Cond. (2) | Cond. (3) | Cond. (4) | Cond. (5) |
|---|---|---|---|---|---|
| Embod. 1 | −0.73 | −1.00 | 13.60 | 0.17 | −20.86 |
| Embod. 2 | −0.68 | −1.04 | 12.86 | 0.17 | −21.23 |
| Embod. 3 | −0.72 | −0.99 | 9.47 | 0.15 | −20.73 |
| Embod. 4 | −0.64 | −0.97 | 10.00 | 0.16 | −21.22 |
| Embod. 5 | −0.62 | −0.83 | 13.04 | 0.16 | −19.66 |
| Embod. 6 | −0.73 | −1.00 | 13.81 | 0.17 | −20.53 |

Each Embodiment satisfies each condition and aberrations are satisfactorily corrected.

According to the above descriptions, a small-sized and cost-effective two-group zoom lens system, with high optical performance, in which a back focal distance can be short, and which has a half angle-of-view of approximately 35° at the short focal-length extremity, and a zoom ratio of approximately 2.8, can be obtained.

What is claimed is:

1. A zoom lens system comprising a positive first lens group and a negative second lens group, in this order form the object;

wherein zooming is performed by varying the distance between said positive first lens group and said negative second lens group;

wherein said positive first lens group includes, on the most-object side, a cemented sub lens group having a negative lens element and a positive lens element; and wherein said zoom lens system satisfies the following conditions:

$-1.2 < r1/fw < -0.3$ $-2 < fw/fc < -0.5$ $8 < v_N - v_P$ wherein
   r1 designates the radius-of-curvature of the most-object side surface of said cemented sub lens group;
   fw designates the focal length of the entire lens system at the short focal length extremity;
   fc designates the focal length of said cemented sub lens group;
   $v_N$ designates the Abbe number of said negative lens element of said cemented sub lens group; and
   $v_P$ designates the Abbe number of said positive lens element of said cemented sub lens group.

2. The zoom lens system according to claim 1, wherein said negative second lens group includes a lens element having at least one aspherical surface, and said aspherical surface satisfies the following condition:

$0 < \Delta VASP < 0.3$ wherein
   ΔVASP designates the amount of change of distortion coefficient due to said aspherical surface under the condition that the focal length of the entire lens system at the short focal length extremity is converted to 1.0.

3. The zoom lens system according to claim 1, wherein said positive first lens group includes a lens element having at least one aspherical surface, and said aspherical surface satisfies the following condition:

$-30 < \Delta IASP < -10$ wherein
   ΔIASP designates the amount of change of spherical aberration coefficient due to said aspherical surface under the condition that the focal length of the entire lens system at the short focal length extremity is converted to 1.0.

4. The zoom lens system according to claim 2, wherein said positive first lens group includes a lens element having at least one aspherical surface, and said aspherical surface satisfies the following condition:

$-30 < \Delta IASP < -10$ wherein
   ΔIASP designates the amount of change of spherical aberration coefficient due to said aspherical surface under the condition that the focal length of the entire lens system at the short focal length extremity is converted to 1.0.

5. The zoom lens system according to claim 1, wherein said positive first lens group further includes another cemented sub lens group having a positive lens element and a negative lens element.

6. The zoom lens system according to claim 2, wherein said positive first lens group further includes another cemented sub lens group having a positive lens element and a negative lens element.

7. The zoom lens system according to claim 1, wherein a diaphragm is provided between the positive first lens group and the negative second lens group, and wherein an open-aperture-diameter of said diaphragm at the short focal length extremity is smaller than an open-aperture-diameter of said diaphragm at the long focal length extremity.

\* \* \* \* \*